(12) United States Patent
Nance et al.

(10) Patent No.: US 6,496,500 B2
(45) Date of Patent: *Dec. 17, 2002

(54) SYSTEM AND METHOD FOR CONTROLLING TELEPHONE CALLS THROUGH A CROSS PLATFORM ENABLED INTERNET BROWSER

(75) Inventors: Nick Nance; Steve Johnson; Mathew Porter, all of Norman; Tracy Boehrer, Edmond, all of OK (US)

(73) Assignee: Alex Information Systems, Inc., Del Mar, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,372
(22) Filed: Jun. 28, 1999
(65) Prior Publication Data
US 2001/0043591 A1 Nov. 22, 2001

(51) Int. Cl.[7] .................................................. H04J 3/24
(52) U.S. Cl. ....................................................... 370/352
(58) Field of Search .................................. 370/351, 352, 370/384, 400, 392, 401–403, 395.52, 395.53, 395.1, 396, 901, 902, 904, 905, 907, 908; 379/93.07, 89, 67, 93.25, 100.11, 201, 207, 90.01, 93.08, 93.09, 93.11, 93.14, 93.15, 93.17, 93.21, 93.24, 93.31, 100.08, 100.13, 142.07, 142.05; 709/203, 204, 208, 213, 232

(56) References Cited

U.S. PATENT DOCUMENTS

| 5,805,587 | A | * | 9/1998 | Norris .......................... 370/352 |
| 5,867,494 | A | * | 2/1999 | Krishnaswamy et al. ... 370/352 |
| 5,867,495 | A | * | 2/1999 | Elliott et al. ................. 370/352 |
| 6,028,848 | A | * | 2/2000 | Bhatia et al. ................ 370/257 |
| 6,118,768 | A | * | 9/2000 | Bhatia et al. ................ 370/254 |

* cited by examiner

Primary Examiner—Dang Ton
(74) Attorney, Agent, or Firm—McDermott, Will & Emery (57) ABSTRACT

A computer based system and method for controlling telephone calls over a computer network. The system comprising an event module for monitoring the telephone network for telephone calls and a web server for delivering one or more pages of call information about each call and displaying one or more call options for disposing each call by a user.

75 Claims, 4 Drawing Sheets

SYSTEM AND METHOD FOR CONTROLLING TELEPHONE CALLS THROUGH A CROSS PLATFORM ENABLED INTERNET BROWSER

TECHNICAL FIELD OF THE INVENTION

The present invention pertains, in general, to computer networks and telephone systems, and more specifically, to a system and method for controlling telephone systems through a computer network, using an Internet browser. This invention is applicable to both digital, packet-based telephone networks, and to those which utilize traditional, analog, voice-transmission technology.

BACKGROUND OF THE INVENTION

When computer telephony technology emerged in the late 1980's, the primary goal was to provide users with control of the telephony network through software. The traditional computer telephony applications consisted of voice-mail and auto attendants. Notwithstanding, as the technology developed, users began to demand control over the telephony network at the desktop. The first type of desktop computer telephony solutions were basic "screen pop" applications. These applications were designed to receive the caller's telephone number, to retrieve information from a customer/contact database using that number, and, finally, to display associated caller information on the desktop screen.

More recently, call control applications have been developed which simplify the usability of the telephone, for example, by performing complex tasks like transferring and conferencing. To date, call control applications are available for specific desktop platforms only, thus, their usefulness is limited throughout the enterprise, and, more importantly, is limited to the local area network. Moreover, systems involving "call transferring" do not provide the recipient/client with the option of placing the call on hold, putting it into voice mail, etc.

Further, when a user originates a call from a foreign country or domestic hotel—either of which impose surcharges on calls—services such as International callback, and thus high pre-paid costs, may be required. In addition, the multitude of cumbersome DTMF entries, upwards of 30 digits, may also be necessary.

SUMMARY OF THE INVENTION

Thus, the present invention is directed to addressing the deficiencies of the prior work discussed above, and specifically, this invention provides the ability to offer call control for both (a) local area network, and (b) the Internet, independent of computer platform, and further to provide the user with the option of manipulating the call, such as by placing it on hold, putting it into voice mail, etc. Users of this invention may also simply click a button to enter a phone number for dialing.

To attain the primary objective, the present invention provides a system and method for controlling calls through a web browser, by utilizing TCP/IP sockets to send packet data between client and server, for the purpose of directing the telephone network. The system comprises a server based telephone module which comprises a Telephony Server, connected to the computer network, provides the interface between client software elements which attempt to control telephone call and telephone equipment. This Telephony Server may be integrated with either external telephone equipment, or with an integral telephone switch. Connectivity to the computer network from the Telephony Server is required to receive commands and/or to send events to a client on the network.

The Telephony Server must include the following software elements: (1) a Telephony Integration Module (TIM) designed to integrate with a telephone system for the purpose of monitoring and control of the telephone network; (2) a Web Server capable of presenting a lightweight user interface over HTML to the client; (3) an Event Server designed to receive events from the TIM, and to pass them to the client; and (4) a Call Control Module capable of receiving commands passed by the client, then sending them to the TIM.

The software-based Telephony Integration Module (TIM) may include hardware necessary to control a Central Office Switch, PBX, Key System, Packet Switch; or, may be integrated with a communications server. The details of such integration, and how it is accomplished, is not pertinent to the definition of this invention. This invention presumes that a layer of software exists on a computer system that is both capable of providing real-time events occurring on the telephone system, and capable of providing direct telephone-call control.

The PC-based Telephony Server can be integrated into many different telecommunications environments. Some of the most commonly used are described below:

Stand-alone: The simplest configuration, phone lines from the phone company are connected directly to the Telephony Server Behind a PBX: The most usual configuration for a Telephony Server in a business environment. The Telephony Server will be connected as one or more extension in a group attached to the company telephone system.

In front of a PBX: This situation allows the Telephony Server to intercept a call before it is passed through to a conventional PBX.

The system further comprises a client based module which comprises client software (which in the preferred embodiment is based on a cross-platform compatible language, and in an especially preferred embodiment, is Java based) that is downloaded, then executed within the environment of a web browser, providing connection to the Telephony Server. As events occur on the telephone network, the Event Server communicates to the client, which then responds with a request to the Web Server for an updated web page. By this mechanism, the need for dynamic HTML is eliminated, thus, support for many different client types is possible.

This invention assumes a specialized computing hardware platform. The voice processing industry is built around one fundamental component: the voice board. A voice board, also called a speech card, is an IBM PC or AT compatible expansion card, which can perform voice-processing functions. Dialogic, Natural Micro Systems and Pika Techonologies provide these types of boards. These voice-processing boards can be installed in a standard PC server.

Thus, the present invention contemplates a system and method for controlling phone calls through Telephony Server and a cross platform enabling internet browser module on the PC/client side for controlling telephone calls with real time display and user directories comprising:

(1) A software-based telephone switch or a computer telephony server with the capability to integrate with an external telephone network.

(2) A web server capable of delivering text and graphic pages over a TCP/IP based network connection.

(3) A server side TCP/IP component that connects to the computer telephony server and provides events and enables call control to the client TCP/IP component. The client server TCP/IP connection is established and maintained through an outbound socket and inbound socket.

(4) A client side cross platform enabled component that connects to the server in to provide real-time client display as events on the server occurs.

BRIEF DESCRIPTION OF THE DRAWINGS

For a more complete understanding of the present invention and its advantages, reference is now made to the following descriptions taken in conjunction with the accompanying drawings, in which.

DETAILED DESCRIPTION OF THE INVENTION

Figure 1:
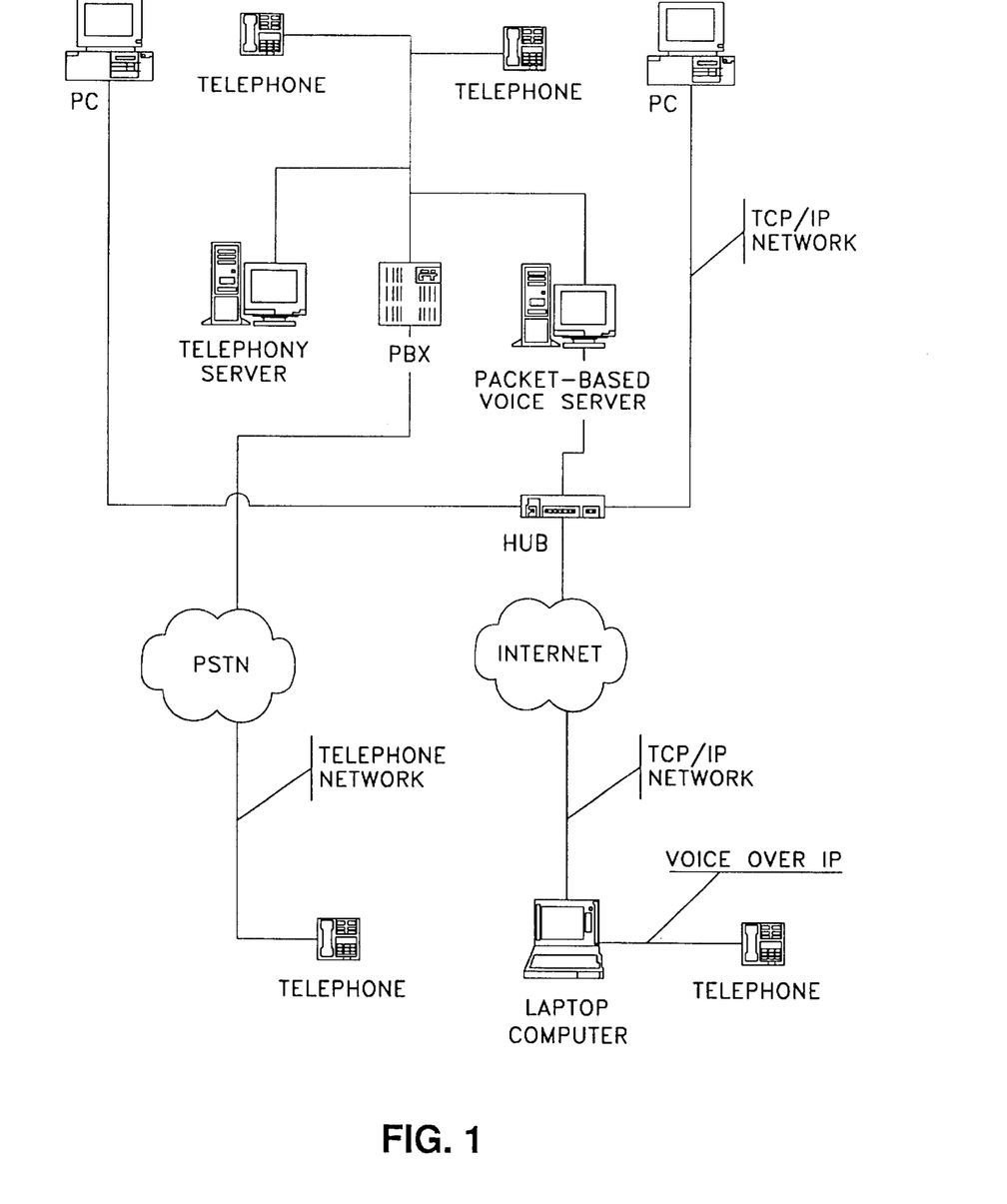
FIG. 1. Illustrates a computer network and telephone system that forms an environment within which the present invention can operate.

Referring initially to FIG. 1, which illustrates a computer network that forms an environment within which the present invention can operate. The network is illustrated as including a telephone instrument along with a client PC connected to a computer network. Other telephone instruments may be coupled to the PC for the transmission of voice over the computer network. The definition of transmission of voice over the computer network is not defined within the current invention. However, the present invention is capable of controlling calls that occur regardless of the transmission system, whether over the PSTN, PBX, or a computer network.

FIG. 1 illustrates the preferred embodiment of how the Telephone Server can be connected to an external telephone switch. All the telephone instruments and the PSTN are connected to the PBX. The Telephone Server and the Packet-Based voice server are connected to the PBX over analog telephone lines.

The Telephony Server module has special telephony hardware for the purpose of connecting and controlling the PBX and usually comprises any type of computer but in a preferred embodiment will be a server, such as one made by Dell Computers of Austin, Tex. (USA). This usually comes in the form of a combination of analog voice ports and a Computer Telephony port provided by the PBX vendor.

Figure 2:
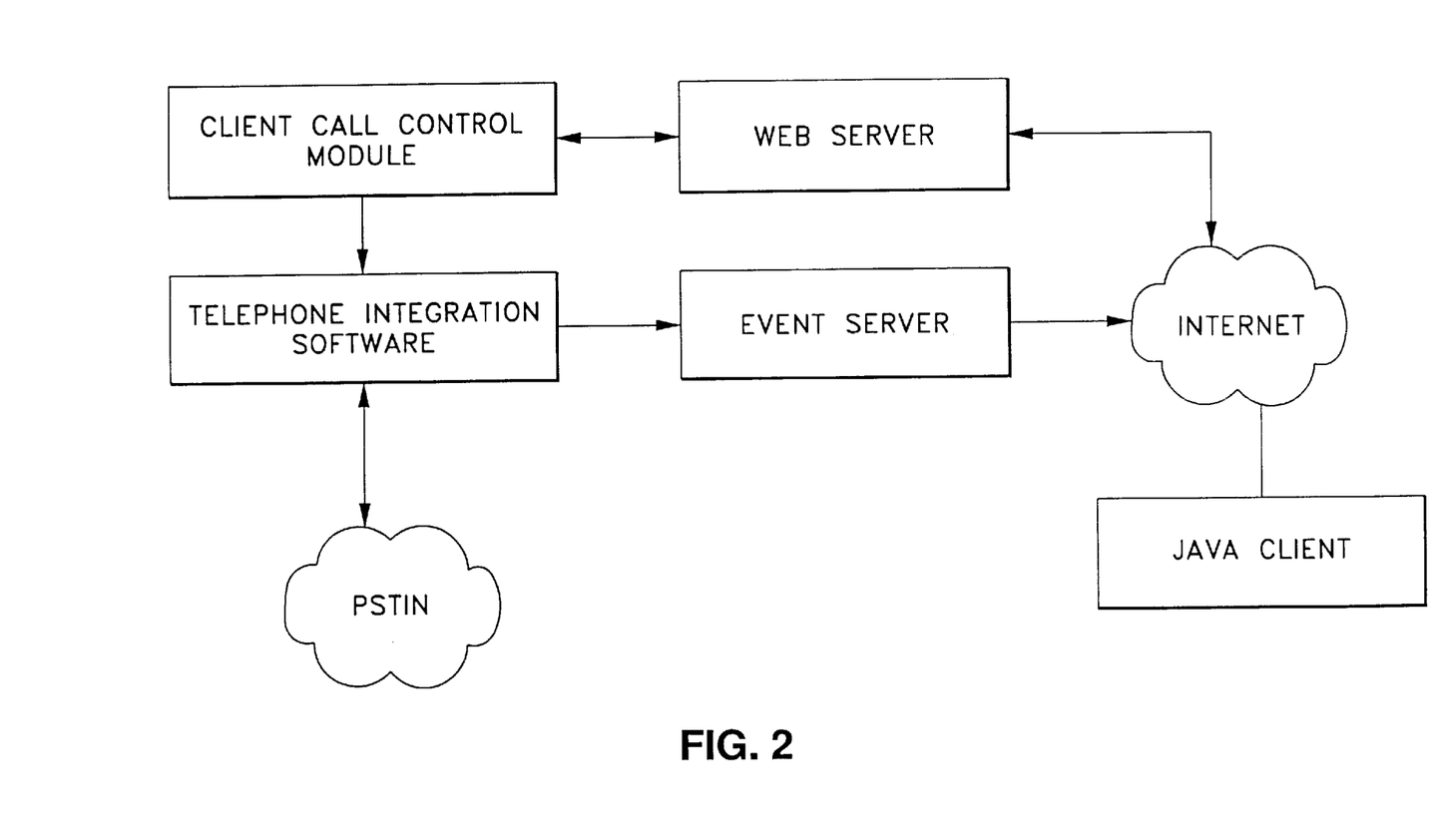
FIG. 2. Illustrates a how the server components inter-operate to achieve the primary goal.

FIG. 2 illustrates the primary software components required in the Telephony Server module. The Telephone Integration Module (TIM) uses hardware and software to connect to an external or internal telephone switch. As events occur on this first telephone system, the TIM notifies the Event Server control module of state changes within that network or system. Similarly, the Client Call Control module sends commands to the TIM to trigger state changes in the telephone network. The Web Server transports commands and events to/from the client over the computer network. This arrangement permits the client to receive real time notification on his computer (which is in communication with a telephone system which may be either a single telephone or an entire telephone network) regarding the incoming call on the first telephone network. With this notification transported to the cross platform/platform independent enabled component (preferably a browser, as further detailed herein), the client or user is provided with options (such as answering the call, forwarding it to voice mail, etc.) which can be effectuated, via the client computer, to either the second telephone system (in the case of where the client wishes to answer the currently incoming call from the first telephone system), or back to the server based telephone module which will manipulate the call in other ways on the first telephone, such as by placing the call in voice mail, etc. Thusly provided, the client is enabled, through the present invention, for receiving and acting upon—at a potentially distant location or different phone number—incoming calls which are originally received at a home or office base.

Figure 3:
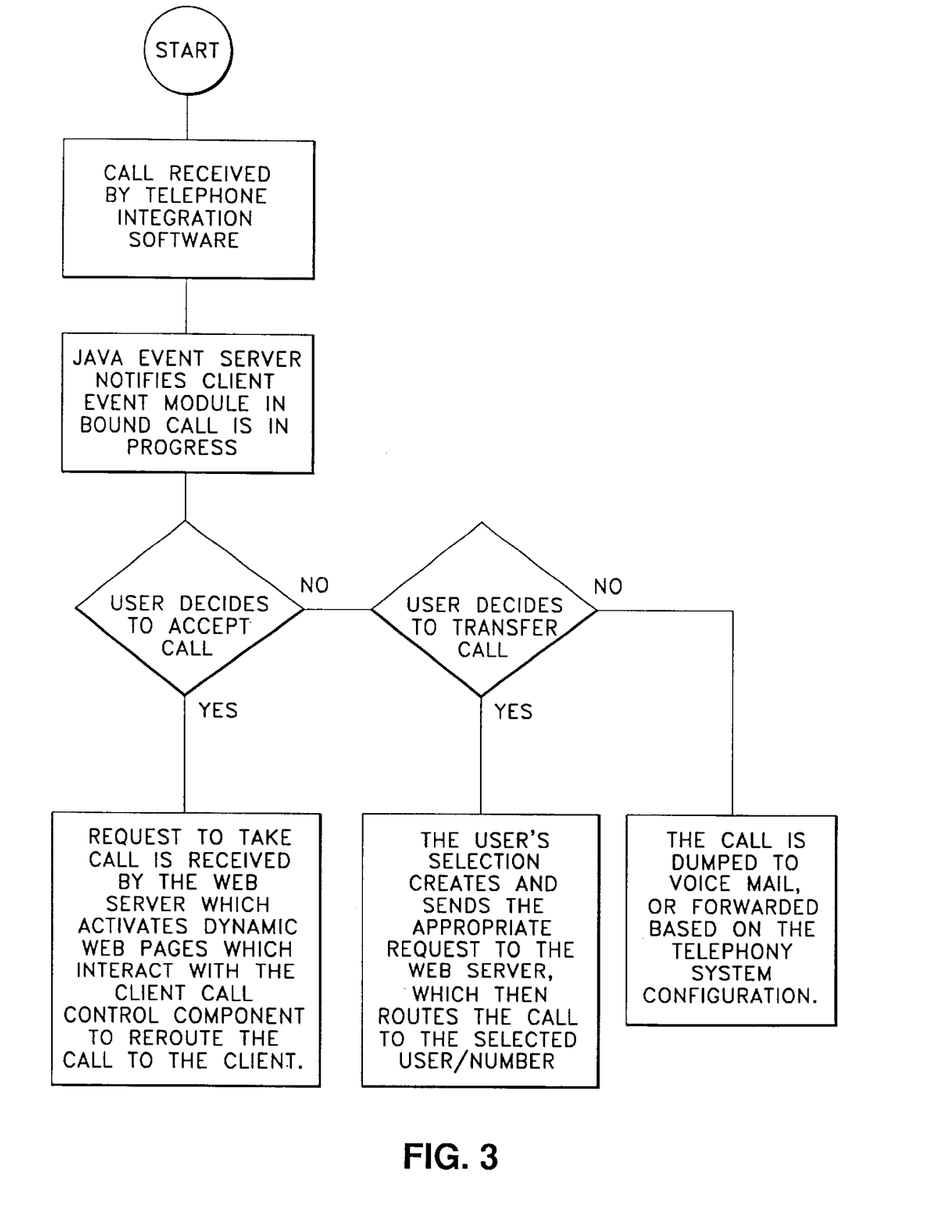
FIG. 3. Illustrates how the client browser components inter-operate to achieve the primary goal.

FIG. 3 displays a typical, call process flow as it is handled by the Telephony Server module elements defined in FIG. 2. For the purpose of this discussion, a user currently connected to the Web Access system via the internet has received a call at the telephone instrument. Step 1, notification of the call is sent to the Event Server module by the Telephone Integration Module (TIM). Step 2, the Event Server module notifies the client module (i.e. preferably Java clients running in a remote web browser portion) that an inbound call is in progress. Step 4, the user decides to accept or reject the call by selecting an option from the new web page received from the web server. Step 5, if the user chooses to accept the call, the Client Call Control module will receive notification from the web server to forward the call to the telephone number or IP address where the user is currently located; otherwise, the user may choose to send the call to voice mail, which is activated by the Client Call Control module.

Figures 4, 5:
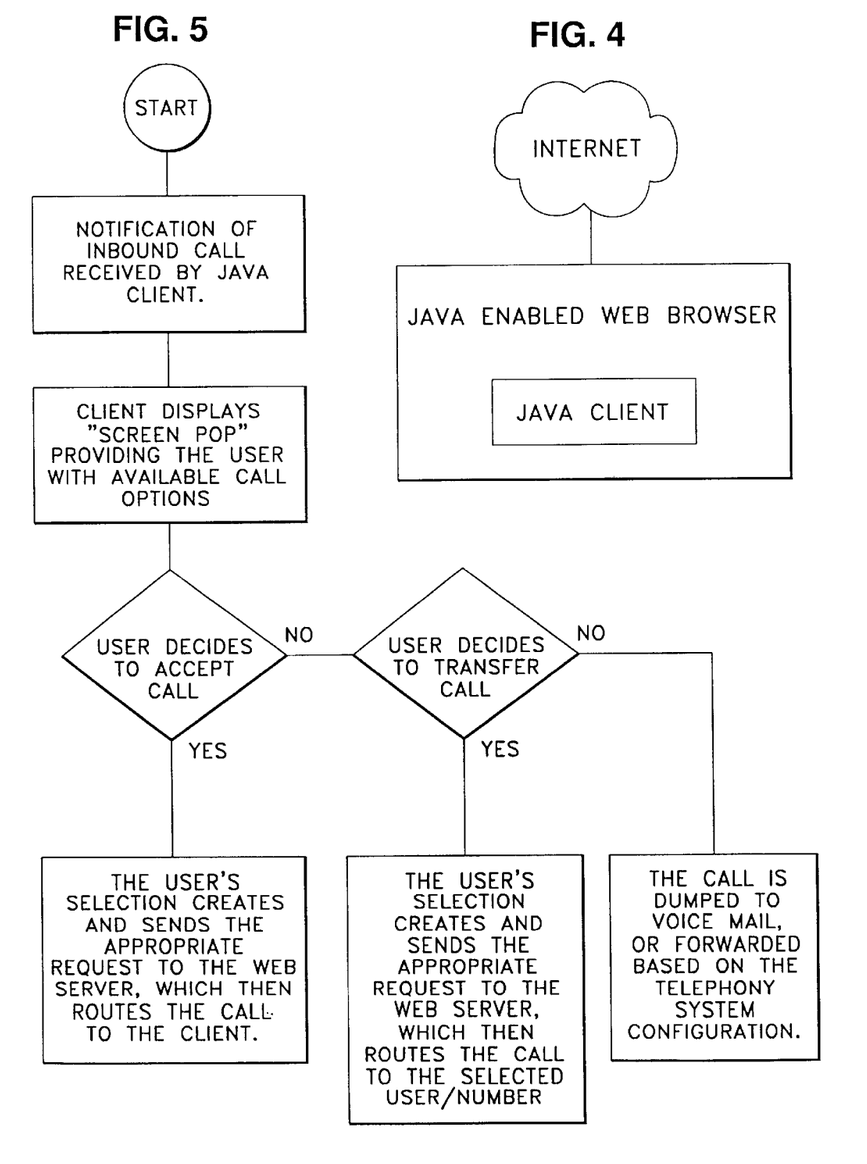
FIG. 4. Illustrates the primary components of the client system.
FIG. 5. Diagrams the client system process for notification of an inbound call.

In reference to FIG. 4, illustrated are the primary components of the client system. The client system has a cross-platform language enabled browser (such as a Java-enabled web browser), typically those marketed under the trademarks Microsoft Internet Explorer or Netscape Navigator which are resident on a computer such as a personal computer or laptop available from International Business Machines of Armonk N.Y. (USA). When the user logs on to the Web Access, a cross platform augmentation (which, in the preferred embodiment, will be a Java-client) is downloaded and activated within the context of the web browser, thus connecting to the Event Server using the computer network and forming the client module.

FIG. 5 diagrams the client system process for notification of an inbound call. For the purpose of discussion, a user currently connected to the Web Access system via the Internet has received a call at their telephone instrument. Step 1, notification of the inbound call is delivered to the Java-client from the Event Server module. Step 2, the Java-client requests a new web page from the Web Server, displaying the inbound caller ID information (such as provided through South Western Bell™) along with the available call options. Step 3, the user may decide to accept the call, which sends a response to the Web Server which instructs the Client Call Control module to activate the TIM. Step 4, if the user decides to reject the call, the Java-client sends a response to the Web Server which instructs the Client Call Control module to send the call to voice mail.

Hence, the present invention provides a system and method for dynamically controlling and routing calls to remote users of a telephone system. The method and apparatus here explicitly contemplates use in all types of phone systems, whether traditional telephone systems or advanced communication server based. Thus, the present invention is not specific to any computer or telephone network protocol, in accordance with the general system elements, which comprise (1) Telephone Server which has the required elements described in FIG. 2, and (2) a Java-enabled Web Browser with the elements described in FIG. 4.

The foregoing has outlined rather broadly the features and technical advantages of the present invention in order that the detailed description of the invention that follows may be better understood. Additional features and advantages of the invention will be described hereinafter which for the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

We claim:

1. A computer based system for managing telephone calls to a telephone system over a computer network, comprising:
    an event module for monitoring a telephone network for telephone calls directed to said telephone system;
    a plurality of client modules connected to said computer network for receiving and displaying call information related to said calls in real-time; and
    a web server for delivering said call information related to said received call and a plurality of call options for disposing each call to a client module associated with said each call in real-time over said computer network, wherein said call options include at least routing said calls on a per call basis to a remote telephone system, thereby enabling a called party to individually route and selectively accept said calls on said remote telephone system in real-time.

2. A computer based system for managing a telephone switching system having a plurality of telephones connected thereto over a computer network, comprising:
    a client module being associated with each telephone and connected said computer network for receiving and displaying call information relating to each telephone call in real-time;
    an event module for monitoring a telephone network for telephone calls directed to a telephone in said plurality of telephones; and
    a web server for delivering said call information and a plurality of call options for disposing each call to a client module associated with said telephone over said computer network, wherein said call options include at least routing said calls on a per call basis to a remote telephone, thereby enabling a called party to individually route and selectively accept said calls on said remote telephone in real-time.

3. A computer based system for managing telephone calls to a telephone system over a computer network, comprising:
    an event module for monitoring a telephone network for a telephone call directed to said telephone system;
    a plurality of client modules connected to said computer network for receiving and displaying call information related to calls in real-time; and
    a web server for delivering said call information and a plurality of call options for disposing each call to a client module associated with said each call in real-time over said computer network, wherein said call options include at least routing said calls on a per call basis to a remote telephone system, thereby enabling a called party to individually route and selectively accept said calls on said remote telephone system in real-time;
    wherein said client module is operable to receive a call option from said plurality of call options selected by said called party for said each call; and
    wherein said web server is operable to route said each call in accordance with said selected call option.

4. The system of claim 3, wherein said call information includes at least identification and telephone number of a calling party.

5. The system of claim 3, wherein said plurality of call options additionally includes at least accepting said calls on said telephone system, sending said calls to a voice mail system, forwarding said calls to another party and placing said calls on hold.

6. The system of claim 3, wherein said web server delivers at least one page of call information and call options; and wherein said page includes graphical and textual information.

7. The system of claim 3, wherein said client modules are java-clients.

8. The system of claim 3, wherein said telephone system is a telephone.

9. The system of claim 3, wherein said telephone system is a PBX.

10. The system of claim 3, wherein said telephone system is a central office switch.

11. The system of claim 3, wherein said web server includes a light weight user interface.

12. The system of claim 3, wherein said web server is operable to be remotely accessible by said called party, thereby enabling said called party to seamlessly and individually route, and selectively accept said each call on said remote telephone system in real-time.

13. The system of claim 3, wherein said computer network is a LAN.

14. The system of claim 3, wherein said computer network is an Internet.

15. A computer based system for managing telephone calls to a telephone system, comprising:
    an event module for monitoring a computer network for telephone calls directed to said telephone system to provide a received call;
    a plurality client modules connected to said computer network for receiving and displaying call information related to said calls in real-time; and
    a web server for delivering said call information and a plurality of call options for disposing each call to a client module associated with said each call in real-time over said computer network, wherein said call options include at least routing said calls on a per call basis to a remote telephone system, thereby enabling a called party associated with said telephone system to individually route and selectively accept said calls on said remote telephone system in real-time;
    wherein said client module is operable to receive a call option from said plurality of call options selected by said called party for said each call; and
    wherein said web server is operable to route said each call in accordance with said selected call option.

16. The module of claim 15, wherein said call information includes at least identification and IP address of a calling party.

17. The system of claim 15, wherein said web server delivers at least one page of call information and call options; and wherein said page includes graphical and textual information.

18. The system of claim 15, wherein said client modules are java-clients.

19. A computer based system for managing a telephone switching system having a plurality of telephones connected thereto over a computer network, comprising:
  a client module being associated with each telephone and connected said computer network for receiving and displaying call information relating to each telephone call in real-time;
  an event module for monitoring a telephone network for telephone calls directed to a telephone in said plurality of telephones; and
  a web server for delivering said call information and a plurality of call options for disposing each call to a client module associated with said telephone over said computer network, wherein said call options include at least routing said calls on a per call basis to a remote telephone, thereby enabling a called party to individually route and selectively accept said calls on said remote telephone in real-time;
  wherein said client module is operable to receive a call option from said plurality of call options selected by said called party for said each call; and
  wherein said web server is operable to route said each call in accordance with said selected call option.

20. The system of claim 19, wherein said call information includes identification and telephone number of a calling party.

21. The system of claim 19, wherein said web server delivers at least one page of call information and call options; and wherein said page includes graphical and textual information.

22. The system of claim 19, wherein said client module is a java-client.

23. The system of claim 19, wherein said plurality of call options additionally includes at least accepting said calls on said telephone, sending said calls to a voice mail system, forwarding said calls to another party and placing said calls on hold.

24. The system of claim 19, wherein said web server is operable to be remotely accessible by said called party, thereby enabling said called party to seamlessly and individually route, and selectively accept said each call on said remote telephone in real-time.

25. The system of claim 19, wherein said telephone switching system is a PBX.

26. A computer based method for managing telephone calls to a telephone system over a computer network, comprising the steps of:
  monitoring a telephone network for telephone calls directed to said telephone system;
  delivering call information and a plurality of call options for disposing each call to a client module associated with said each call in real-time over said computer network, wherein said call options include at least routing said calls on a per call basis to a remote telephone system, thereby enabling a called party to individually route and selectively accept said calls on said remote telephone system in real-time;
  displaying said call information and said plurality of call options to said called party in real-time by said client module;
  receiving from said client module a call option from said plurality of call options selected by said called party for said each call over said computer network; and
  routing said each call in accordance with said selected call option.

27. The method of claim 26, wherein said call information includes at least identification and telephone number of a calling party.

28. The method of claim 26, wherein the step of delivering delivers at least one page of call information and call options; wherein said page includes graphical and textual information; and wherein the step of displaying displays said page to said user.

29. The method of claim 26, wherein said client modules are java-clients.

30. The method of claim 26, wherein said plurality of call options additionally includes at least accepting said calls on said telephone system, sending said calls to a voice mail system, forwarding said calls to another party and placing said calls on hold.

31. The method of claim 26, wherein said computer network is a LAN.

32. The method of claim 26, wherein said computer network is an Internet.

33. A computer based method for managing a telephone switching system having a plurality of telephones connected thereto over a computer network, comprising the steps of:
  monitoring a telephone network for calls directed to a telephone in said plurality of telephones; and
  delivering call information and a plurality of call options for disposing each call to a client module associated with said telephone in real-time over said computer network, wherein said call options include at least routing said calls on a per call basis to a remote telephone, thereby enabling a called party to individually route and selectively accept said calls on said remote telephone in real-time;
  displaying said call information and said plurality of call options to said called party in real-time by said client module;
  receiving from said client module a call option from said plurality of call options selected by said called party for said each call over said computer network; and
  routing said each call in accordance with said selected call option.

34. The method of claim 33, wherein said call information includes at least identification and telephone number of a calling party.

35. The method of claim 33, wherein the step of delivering delivers at least one page of call information and call options; wherein said page includes graphical and textual information; and wherein the step of displaying displays said page to said user.

36. The method of claim 33, wherein said client module is a java-client.

37. The method of claim 33, wherein said plurality of call options includes at least accepting said calls on said telephone, sending said calls to a voice mail system, forwarding said calls to another party and placing said calls on hold.

38. Computer executable process steps stored on a computer readable medium, said computer executable process steps for managing at least one telephone call to a telephone system over a computer network, the process comprising the steps of:

an event monitoring step for monitoring a telephone network for telephone calls directed to said telephone system;

a receiving step for receiving call information related to said calls in real-time;

a display step for displaying call information related to received calls in real-time; and a delivery step for delivering said call information related to said received call and a plurality of call options for disposing each call to a client module associated with said each call in real-time over said computer network, wherein said call options include at least routing said at least one telephone call on a per call basis to a remote telephone system, thereby enabling a called party to individually route and selectively accept said at least one telephone call on said remote telephone system in real-time.

39. Computer executable process steps stored on a computer readable medium, said computer executable process steps for managing a telephone switching system having at least one telephone connected thereto over a computer network, the process comprising the steps:

a receiving step for receiving and displaying call information relating to each telephone call in real-time using a client module associated with each telephone and connected to said computer network for;

a monitoring step for monitoring a telephone network for telephone calls directed to a telephone in said plurality of telephones; and a delivery step for delivering said call information and a plurality of call options for disposing each call to a client module associated with said telephone over said computer network, wherein said call options include at least routing said calls on a per call basis to a remote telephone, thereby enabling a called party to individually route and selectively accept said calls on said remote telephone in real-time.

40. Computer executable process steps stored on a computer readable medium, said computer executable process steps for managing telephone calls to a telephone system over a computer network, the process comprising the steps of:

an event monitoring step for monitoring a telephone network for a telephone call directed to said telephone system;

a receiving step for receiving and displaying call information related to calls in real-time using at least one client module; and a delivery step for delivering said call information and a plurality of call options for disposing each call to a client module associated with said each call in real-time over said computer network, wherein said call options include at least routing said calls on a per call basis to a remote telephone system, thereby enabling a called party to individually route and selectively accept said calls on said remote telephone system in real-time;

wherein said at least one client module is operable to receive a call option from said plurality of call options selected by said called party for each call; and wherein said delivery step is operable to route said each cell in accordance with said selected call option.

41. Computer executable process steps according to claim 40, wherein said call information includes at least identification and telephone number of a calling party.

42. Computer executable process steps according to claim 40, wherein said plurality of call options additionally includes at least accepting said calls on said telephone system, sending said calls to a voice mail system, forwarding said calls to another party and placing said calls on hold.

43. Computer executable process steps according to claim 40, wherein in said delivery step, a web server delivers at least one page of call information and call options; and wherein said page includes graphical and textual information.

44. Computer executable process steps according to claim 40, wherein in said receiving step, the at least one client module is a java-client.

45. Computer executable process steps according to claim 40, wherein said telephone system is a telephone.

46. Computer executable process steps according to claim 40, wherein said telephone system is a PBX.

47. Computer executable process steps according to claim 40, wherein said telephone system is a central office switch.

48. Computer executable process steps according to claim 43, wherein said web server includes a light weight user interface.

49. Computer executable process steps according to claim 43, wherein said web server is operable to be remotely accessible by said called party, thereby enabling said called party to seamlessly and individually route, and selectively accept said each call on said remote telephone system in real-time.

50. Computer executable process steps according to claim 40, wherein said computer network is a LAN.

51. Computer executable process steps according to claim 40, wherein said computer network is an Internet.

52. Computer executable process steps stored on a computer readable medium, said computer executable process steps for managing telephone calls to a telephone system, the process comprising the steps of:

an event monitoring step for monitoring a computer network for telephone calls directed to said telephone system to provide a received call;

a receiving step for receiving call information related to said calls in real-time using at least one client module; and a delivery step for delivering said call information and a plurality of call options for disposing each call to a client module associated with said each call in real-time over said computer network, wherein said call options include at least routing said calls on a per call basis to a remote telephone system, thereby enabling a called party associated with said telephone system to individually route and selectively accept said calls on said remote telephone system in real-time;

wherein said at least one client module is operable to receive a call option from said plurality of call options selected by said called party for each call; and wherein said delivery step is operable to route said each call in accordance with said selected call option.

53. Computer executable process steps stored on a computer readable medium, said computer executable process steps for managing telephone calls to a telephone system, the process comprising the steps of:

an event monitoring step for monitoring a computer network for telephone calls directed to said telephone system to provide a received call;

a receiving step for receiving and displaying call information related to said calls in real-time using at least one client module; and a delivery step for delivering said call information and a plurality of call options for disposing each call to a client module associated with said each call in real-time over said computer network, wherein said call options include at least routing said calls on a per call basis to a remote telephone system, thereby enabling a called party associated with said telephone system to individually route and selectively accept said calls on said remote telephone system in real-time;

wherein said at least one client module is operable to receive a call option from said plurality of call options selected by said called party for each call; and wherein said delivery step is operable to route said each call in accordance with said selected call option.

54. Computer executable process steps according to claim 53, wherein said call information includes at least identification and IP address of a calling party.

55. Computer executable process steps according to claim 53, wherein in said delivery step, a web server delivers at least one page of call information and call options; and wherein said page includes graphical and textual information.

56. Computer executable process steps according to claim 53, wherein said at least one client module is a java-client.

57. Computer executable process steps stored on a computer readable medium, said computer executable process steps for managing a telephone switching system having at least one telephone connected thereto over a computer network, the process comprising the steps of:

a step for receiving and displaying call information relating to each telephone call in real-time using a client module being associated with each telephone and connected to said computer network;

an event monitoring step for monitoring a telephone network for telephone calls directed to a telephone in said plurality of telephones; and a delivery step for delivering said call information and a plurality of call options for disposing each call to a client module associated with said telephone over said computer network, wherein said call options include at least routing said calls on a per call basis to a remote telephone, thereby enabling a called party to individually route and selectively accept calls on said remote telephone in real-time;

wherein said client module is operable to receive a call option from said plurality of call options selected by said called party for said each call; and wherein delivery step is operable to route said each call in accordance with said selected call option.

58. Computer executable process steps according to claim 57, wherein said call information includes identification and telephone number of a calling party.

59. Computer executable process steps according to claim 57, wherein in said delivery step, a web server delivers at least one page of call information and call options; and wherein said page includes graphical and textual information.

60. Computer executable process steps according to claim 57, wherein said client module is java-client.

61. Computer executable process steps according to claim 57, wherein said plurality of call options additionally includes at least accepting said cells on said telephone, sending said calls to a voice mail system, forwarding said calls to another party and placing said calls on hold.

62. Computer executable process steps according to claim 59, wherein said web server is operable to be remotely accessible by said called party, thereby enabling said called party to seamlessly and individually route, and selectively accept said each call on said remote telephone in real-time.

63. Computer executable process steps according to claim 57, wherein said telephone switching system is a PBX.

64. Computer executable process steps stored on a computer readable medium, said computer executable process steps for managing telephone calls to a telephone system over a computer network, the process steps comprising the steps of:

monitoring a telephone network for telephone calls directed to said telephone system;

delivering call information and a plurality of call options for disposing each call to a client module associated with said each call in real-time over said computer network, wherein said call options include at least routing said calls on a per call basis to a remote telephone system, thereby enabling a called party to individually route and selectively accept said calls on said remote telephone system in real-time;

displaying said call information and said plurality of call options to said called party in real-time by said client module;

receiving from said client module a call option from said plurality of call options selected by said called party for said each call over said computer network; and routing said each call in accordance with said selected call option.

65. Computer executable process steps according to claim 64, wherein said information includes at least identification and telephone number of a calling party.

66. Computer executable process steps according to claim 64, wherein the step of delivering delivers at least one page of call information and call options; wherein said page includes graphical and textual information; and wherein the step of displaying displays said page to said user.

67. Computer executable process steps according to claim 64, wherein said client is a java-client.

68. Computer executable process steps according to claim 64, wherein said plurality of call options additionally includes at least accepting said calls on said telephone system, sending said calls to a voice mail system, forwarding said calls to another party and placing said calls on hold.

69. Computer executable process steps according to claim 64, wherein said computer network is a LAN.

70. Computer executable process steps according to claim 64, wherein said computer network is an Internet.

71. Computer executable process steps stored on a computer readable medium, said computer executable process steps for managing a telephone switching system having a plurality of telephones connected thereto over a computer network, the process comprising the steps of:

monitoring a telephone network for calls directed to a telephone in said plurality of telephones; and delivering call information and a plurality of call options for disposing each call to a client module associated with said telephone in real-time over said computer network, wherein said call options include at least routing said calls on a per call basis to a remote telephone, thereby enabling a called party to individually route and selectively accept said calls on said remote telephone in real-time;

displaying said call information and said plurality of call options to said called party in real-time by said client module;

receiving from said client module a call option from said plurality of call options selected by said called party for said each call over said computer network; and routing said each call in accordance with said selected call option.

72. Computer executable process steps according to claim 71, wherein said call information includes at least identification and telephone number of calling party, 73. Computer executable process steps according to claim 71, wherein the step of delivering delivers at least one page of call information and call options; wherein said page includes graphical and textual information; and wherein the step of displaying displays said page to said user.

74. Computer executable process steps according to claim 71, wherein said client module is a java-client.

75. Computer executable process steps according to claim 71, wherein said plurality of call options includes at least accepting said calls on said telephone, sending said calls to a voice mail system, forwarding said calls to another party and placing said calls on hold.

* * * * *